(12) United States Patent
Kikuchi

(10) Patent No.: US 8,253,882 B2
(45) Date of Patent: Aug. 28, 2012

(54) DISPLAY DEVICE

(75) Inventor: Katsutoshi Kikuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 56 days.

(21) Appl. No.: 12/997,929

(22) PCT Filed: Jun. 2, 2009

(86) PCT No.: PCT/JP2009/060065
§ 371 (c)(1),
(2), (4) Date: Dec. 14, 2010

(87) PCT Pub. No.: WO2010/016317
PCT Pub. Date: Feb. 11, 2010

(65) Prior Publication Data
US 2011/0096262 A1 Apr. 28, 2011

(30) Foreign Application Priority Data
Aug. 7, 2008 (JP) .................................. 2008-203749

(51) Int. Cl.
*G02F 1/1333* (2006.01)
*G02F 1/13357* (2006.01)
(52) U.S. Cl. .......................................... 349/58; 349/61
(58) Field of Classification Search .................... 349/58, 349/60, 61, 158, 160; 361/679.02, 679.26, 361/679.3; 345/905
See application file for complete search history.

(56) References Cited

U.S. PATENT DOCUMENTS

| | | | |
|---|---|---|---|
| 2002/0001187 A1* | 1/2002 | Murofushi | 362/31 |
| 2005/0117197 A1 | 6/2005 | Ide | |
| 2009/0015747 A1* | 1/2009 | Nishizawa et al. | 349/58 |
| 2009/0096965 A1* | 4/2009 | Nagata | 349/103 |
| 2009/0122223 A1* | 5/2009 | Hayano et al. | 349/58 |
| 2009/0161048 A1* | 6/2009 | Satake et al. | 349/110 |

FOREIGN PATENT DOCUMENTS

EP 1 089 110 A2 4/2001
(Continued)

OTHER PUBLICATIONS

Official Communication issued in International Patent Application No. PCT/JP2009/060065, mailed on Sep. 1, 2009.

*Primary Examiner* — Dung Nguyen
*Assistant Examiner* — Tai Duong
(74) *Attorney, Agent, or Firm* — Keating & Bennett, LLP

(57) ABSTRACT

A display device (1) having a curved display surface (2) sandwiches a display panel (5) by means of a pair of curved covers (10, 11). The display device (1) has a plurality of engaging sections (12), which are formed on each of the two side surfaces arranged to face each other with the display panel (5) therebetween and fix the pair of covers (10, 11) so that the covers are not removed. An intermediate position (C1) in the curving direction of the covers (10, 11) and an intermediate position (C2) in the curving direction of the display surface (2) are shifted from each other. The engaging sections (12) on each of the two side surfaces are substantially symmetrically arranged with the display panel (5) therebetween, and the positions where the engaging sections (12) are arranged include at least the both end sections (E1, E2) in the curving direction, and a display surface intermediate section (CB) which includes the intermediate position (C2) of the display surface (2) in the curving direction.

12 Claims, 6 Drawing Sheets

FOREIGN PATENT DOCUMENTS

| | | |
|---|---|---|
| JP | 62-105185 A | 5/1987 |
| JP | 6-160820 A | 6/1994 |
| JP | 2002-351347 A | 12/2002 |
| JP | 2003-50392 A | 2/2003 |
| JP | 2004-69627 A | 3/2004 |
| JP | 2005-134461 A | 5/2005 |
| JP | 2006-106603 A | 4/2006 |
| JP | 2007-333818 A | 12/2007 |

* cited by examiner

DISPLAY DEVICE

TECHNICAL FIELD

The present invention relates to a display device, and more particularly to a structure of a display device having a curved display surface.

BACKGROUND ART

Conventionally, electronic appliances such as information, television, and amusement appliances incorporate display devices. Representative of such display devices are liquid crystal display devices using liquid crystal. Specifically, liquid crystal display devices are used in mobile telephones, PDAs (personal digital assistants), DVD players, mobile game appliances, notebook PCs (personal computers), PC monitors, television monitors. etc.

In display devices conventionally in wide use, the display surface is usually flat. On the other hand, recent years have seen proposals of display devices having a curved display surface for, for example, design and other reasons (see, for example, Patent Documents 1 and 2 listed below). FIG. 10 is a schematic perspective view showing the exterior structure of a conventional liquid crystal display device having a curved display surface.

As shown in FIG. 10, in the conventional liquid crystal display device 100, a display panel and a backlight disposed behind it are held between a pair of curved covers (consisting of a top cover 101 and a bottom 102) so as to form a curved display surface 103. The top cover 101 has an opening formed in it so as to expose the display surface 103.

In the liquid crystal display device 100, the display panel held between the top and bottom covers 101 and 102 is originally flat, and gets bent when held between the top and bottom covers 101 and 102 so as to produce the curved display surface 103. Consequently, in the conventional liquid crystal display device 100, the stress resulting from the display panel being bent causes problems such as displacement of the display panel and uneven display in the liquid crystal display presented on the display surface 103.

LIST OF CITATIONS

Patent Literature

Patent Document 1: JP-A-2007-333818
Patent Document 2: JP-A-2005-134461

SUMMARY OF INVENTION

Technical Problem

In view of the problems mentioned above, it is an object of the present invention to provide a display device that has a curved display surface and that is less likely to suffer from uneven display on a display panel. It is another object of the present invention to provide a display device that has a curved display surface and that is less likely to suffer from displacement of a display panel.

Solution to Problem

To achieve the above objects, according to the invention, a display device includes: a display panel kept in a bent state so as to have a curved display surface; a pair of curved covers holding the display panel therebetween; and a plurality of engagement portions formed in each of two side faces disposed opposite each other across the display panel, the engagement portions fixing the covers together so as not to come off. Moreover, in the display device according to the invention, the middle position of the covers in the curve direction is displaced from the middle position of the display surface in the curve direction; the engagement portions provided in one of the two side faces and the engagement portions provided in the other of the two side faces are disposed substantially symmetrically across the display panel; and the positions at which the engagement portions are provided at least include both end parts in the curve direction and a display surface middle part including the middle position of the display surface in the curve direction.

Here, the "curve direction" is the direction along the bow-like curve along which a curved surface intersects a plane on which lie a plurality of lines normal to the curved surface at different positions.

With this structure, consideration is given to the fact that the middle position, in the curve direction, of the covers constituting the display device is displaced from the middle position, in the curve direction, of the display surface, and with respect to the middle position of the display surface in the curve direction, the engagement portions are provided. This makes it easy to reduce uneven display occurring on the display screen. In this structure, it is preferable that the center position, in the curve direction, of the engagement portion disposed at the display surface middle part approximately coincide with the middle position of the display surface in the curve direction.

In the display device structured as described above, it is preferable that the positions at which the engagement portions are provided further include at least one location between one of the end parts and the display surface middle part and at least one location between the other of the end parts and the display surface middle part, and that any engagement portion disposed between the one of the end parts and the display surface middle part and any engagement portion disposed between the other of the end parts and the display surface middle part be disposed substantially symmetrically about the display surface middle part.

With this structure, it is easy to spread the stress occurring at the engagement portions as a result of a number of engagement portions being provided. Moreover, disposing the engagement portions with respect to the middle position of the display surface in the curve direction makes it easy to spread the stress occurring at the engagement portions in a way that makes uneven display less likely to occur. Moreover, with this structure, as a result of a number of engagement portions being provided, it is possible to keep the display panel in fixed position more securely than is conventionally possible, and this makes dislocation of the display panel less likely to occur.

In the display device structured as described above, it is further preferable that, of any engagement portion disposed between the one of the end parts and the display surface middle part and any engagement portion disposed between the other of the end parts and the display surface middle part, at least an engagement portion adjacent to the engagement portion disposed at the display surface middle part be disposed between, at one end, the midpoint, in the curve direction, between the engagement portion disposed at the one of the end parts and the engagement portion disposed at the display surface middle part and, at the other end, the midpoint, in the curve direction, between the engagement portion disposed at the other of the end parts and the engagement portion disposed at the display surface middle part. With this structure, a plurality of engagement portions are provided at positions as close as possible to the middle position of the display surface in the curve direction, and this makes it easy to suppress uneven display.

In the display device structured as described above, the engagement portions may each comprise an engaging claw provided on one of the covers and an engaging hole provided in the other of the covers to engage with the engaging claw. In a modified structure, the engagement portions may each comprise an engaging claw provided on a curved frame member accommodated inside the covers and an engaging hole provided in both of the covers to engage with the engaging claw.

In the display device structured as described above, the display panel may be a liquid crystal display panel; a backlight may be disposed behind the display panel in the bent state; and the display panel and the backlight may be held between the covers. With this structure, it is possible to give a liquid crystal display device as a representative of display panels a structure that, even with a curved display surface, is less likely to suffer from uneven display or displacement of a display panel.

Advantageous Effects of the Invention

According to the present invention, it is possible to make a display device having a curved display surface less likely to suffer from uneven display on a display panel and less likely to suffer from displacement of a display panel.

DESCRIPTION OF EMBODIMENTS

A description will now be given of a display device embodying the present invention with reference to the accompanying drawings. The following description takes up a liquid crystal display device as an example of a display device.

Figure 1:
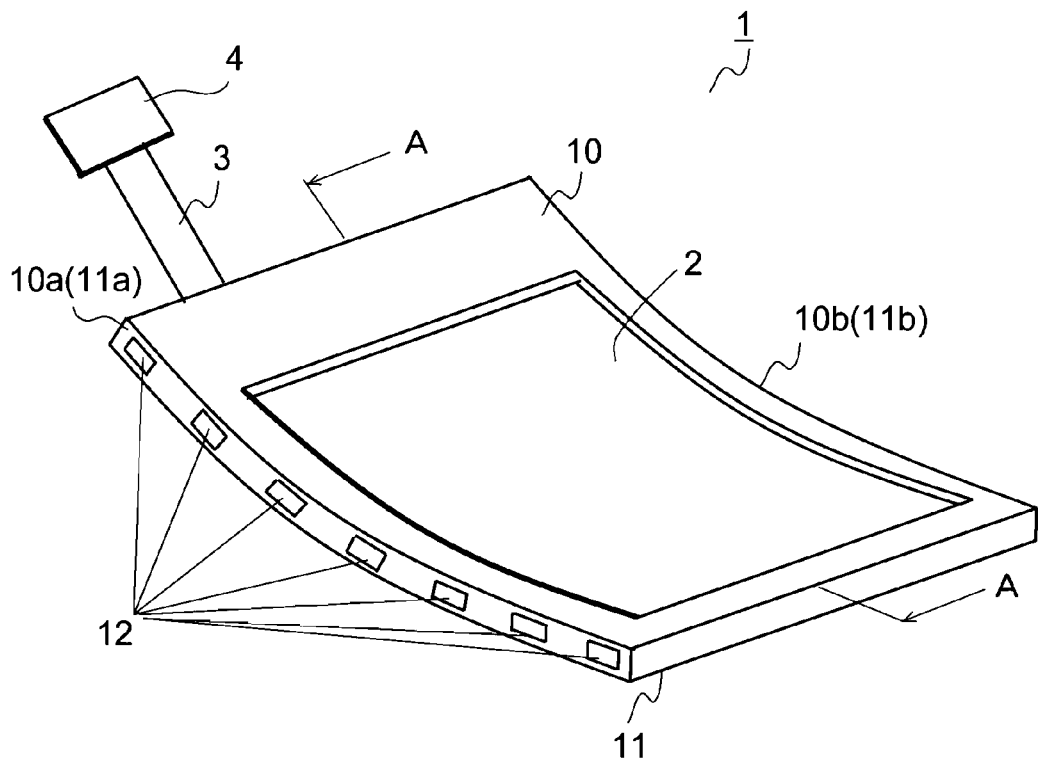
FIG. 1 is a schematic perspective view of a liquid crystal display device as one embodiment.
Figure 2:
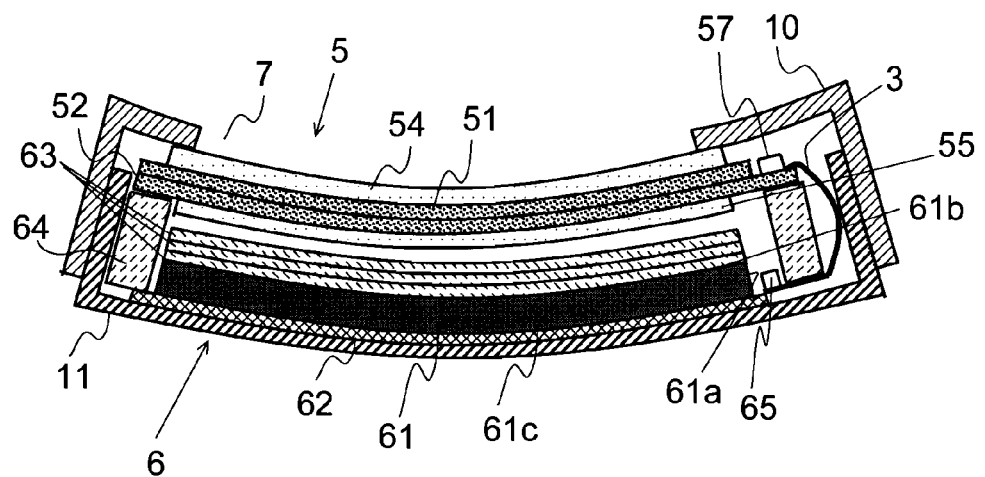
FIG. 2 is a schematic sectional view along line A-A in FIG. 1.
Figure 3:
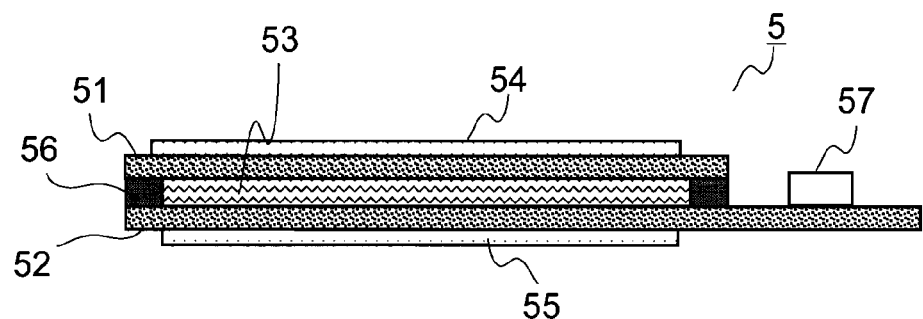
FIG. 3 is a schematic sectional view showing the structure of the display panel provided in the liquid crystal display device of the embodiment.

First, an outline of the structure of the liquid crystal display device of this embodiment will be described with reference to FIGS. 1 to 3. FIG. 1 is a schematic perspective view of the liquid crystal display device of the embodiment. FIG. 2 is a schematic sectional view along line A-A in FIG. 1. FIG. 3 is a schematic sectional view showing the structure of the display panel provided in the liquid crystal display device of the embodiment.

As shown in FIG. 1, the liquid crystal display device 1 of the embodiment has a display surface 2 that is curved. Specifically, the display surface 2 is concave. The liquid crystal display device 1 has an FPC (flexible printed circuit) 3 connected to it that is used for input of an external signal. The FPC 3 is, at an end, fitted with a connector 4.

As shown in FIG. 2, the liquid crystal display device 1 of the embodiment is structured such that a top cover 10 and a bottom cover 11 hold between them a display panel 5 and a backlight 6. The top and bottom covers 10 and 11 are both substantially rectangular as seen in a plan view, and are both previously curved. The top cover 10 has an opening 7 formed in it so as to form the display panel 2. The top and bottom covers 10 and 11 are engaged with each other at engaging portions 12, and are thereby fixed together so that the top cover 10 may not come off the bottom cover 11. The engaging portions 12 will be described in detail later.

As shown in FIG. 3, the display panel 5 is originally not curved, and gets bent when held between the top and bottom covers 10 and 11 into a curved state as shown in FIG. 2. Specifically, the display panel 5 includes a first panel substrate 51, a second panel substrate 52, liquid crystal 53, a first polarizing plate 54, and a second polarizing plate 55. The first polarizing plate 54 is stuck on the first panel substrate 51, and the second polarizing plate 55 is stuck on the second panel substrate 52.

The first and second panel substrates 51 and 52 are formed of, for example, glass, and are formed so thin as to be easy to bend. The first and second panel substrates 51 and 52 are disposed such that their respective principal surfaces (largest surfaces) face each other, and are stuck together with a frame-shaped seal 56 such that a predetermined gap is left vertically. The first and second panel substrates 51 and 52 are both substantially rectangular as seen in a plan view, and the second panel substrate 52 is formed larger than the first panel substrate 51. Thus, part of the second panel substrate 52 lies beyond the edge of the first panel substrate 51, and in that part of the second panel substrate 52, an IC chip 57 provided with a circuit for driving the display surface 2 is mounted by, for example, a COG (chip-on-glass) method.

On the first panel substrate 51, there are formed, in order of closeness to the liquid crystal 53, a counter-electrode and a color filter, of which neither is illustrated. On the second panel substrate 52, there is formed a matrix-like array of switching devices, such as TFTs (thin-film transistors), and pixel electrodes connected to them (none is illustrated). Moreover, for the purpose of driving those switching devices, there are formed a plurality of scanning signal lines and a plurality of data signal lines (none is illustrated) such that the former cross the latter.

The liquid crystal 53 is sealed in the space surrounded by the first and second panel substrates 51 and 52 and the frame-shaped seal 56. When a voltage is applied to it, the liquid crystal 53 changes its optical properties (light transmittance). The liquid crystal 53 being sandwiched between the pixel electrodes and the counter-electrode forms the display surface 2 (see FIG. 1), on which liquid crystal display takes place.

The backlight 6 includes a light guide plate 61, a reflective sheet 62, an optical sheet 63, a holder 64, and a light-emitting diode (LED) 65.

The light guide plate 61 is formed of, for example, polycarbonate resin or the like, and is previously curved. On the bottom surface 61c side of the light guide plate 61 is provided the reflective sheet 62, which reflects part of the light traveling through the light guide plate 61. Thus, the light that has entered the light guide plate 61 through its edge part 61a emanates from the light guide plate 61 through its top surface 61b as planar light.

On the top surface 61b side of the light guide plate 61 is provided the optical sheet 63. Specifically, the optical sheet 63 is composed of three sheets which are, from bottom up, a diffusive sheet, a lower prism sheet, and an upper prism sheet. The optical sheet 63 is provided for the purpose, among others, of extracting the light emanating from the light guide plate 61 efficiently and evenly, and its structure is not limited to the specific one adopted in this embodiment. The reflective sheet 62 and the optical sheet 63 are, in a bent state, accommodated between the top and bottom covers 10 and 11.

The holder 64 is a frame member shaped like a picture frame, and is disposed on top the bottom cover 11. The holder 64 serves to keep in fixed position the light guide plate 61, the reflective sheet 62, and the optical sheet 63. On top of the holder 64, the display panel 5 is placed, with a peripheral part of the latter adhered to the former. The holder 64 is previously curved.

The LED 65 comprises a plurality of LEDs disposed near the edge 61a of the light guide plate 61. This allows light to enter the light guide plate 61 through its edge 61a. In FIG. 2, the LEDs 65 are disposed at predetermined intervals in a row in the direction perpendicular to the plane of the page. The LEDs are mounted on the FPC 3.

In outline, the liquid crystal display device 1 of the embodiment is structured as described above. What is prominent about the liquid crystal display device 1 of the embodiment is that it is less likely to suffer from uneven display on the display surface 2 or displacement of the display panel 5. How this is achieved will now be described.

Figure 10:
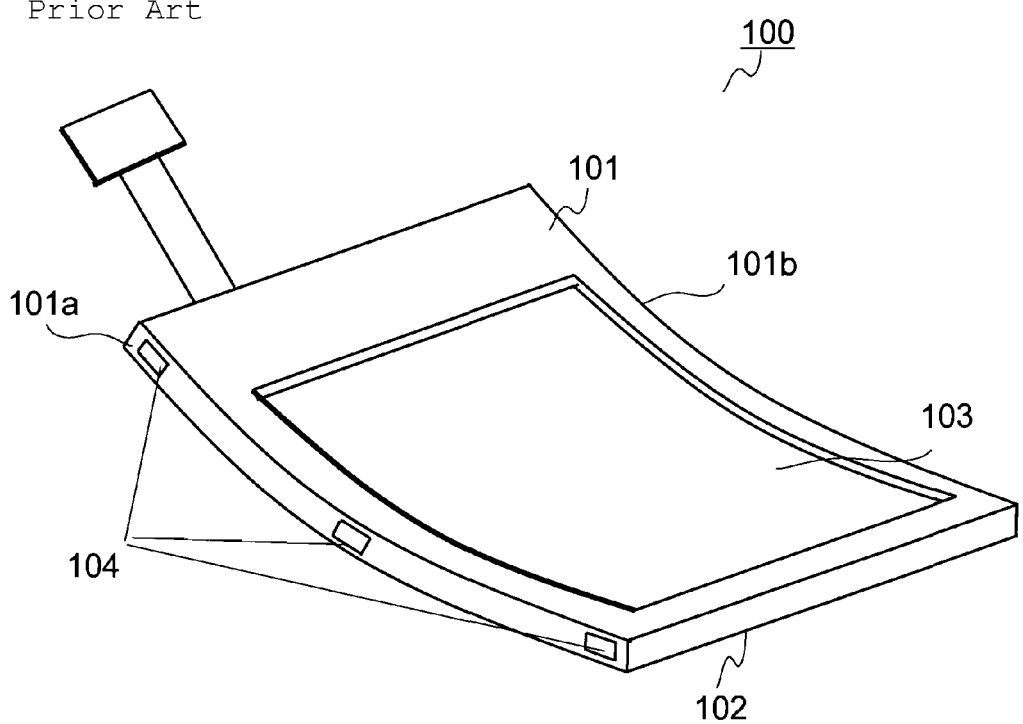
FIG. 10 is a schematic perspective view showing the exterior structure of a conventional liquid crystal display device having a curved display surface.
Figure 11:
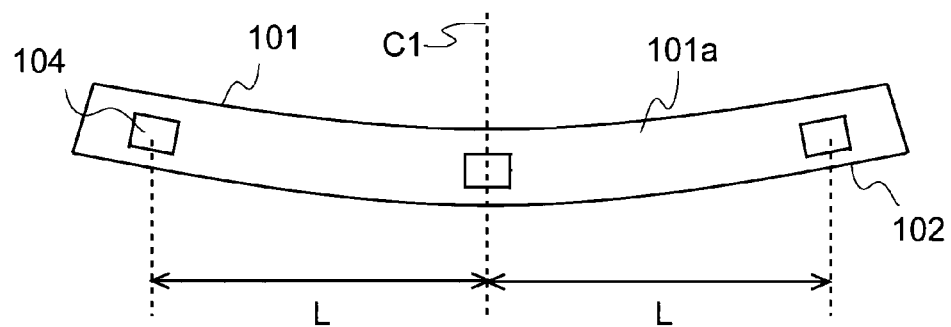
FIG. 11 is a schematic side view showing the structure of the conventional liquid crystal display device.
Figure 12:
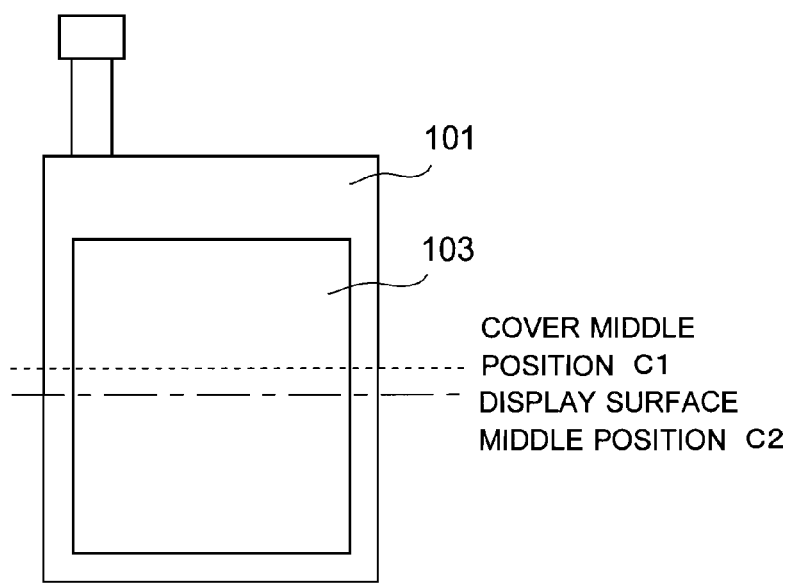
FIG. 12 is a schematic plan view showing the structure of the conventional liquid crystal display device.

First, for easy understanding of the structure of the embodiment, a description will be given of the structure of the conventional liquid crystal display device 100 (see FIG. 10) accompanied by the results of its study by the present applicant, with reference to FIGS. 11 and 12. FIG. 11 is a schematic side view showing the structure of the liquid crystal display device 100. FIG. 12 is a schematic plan view showing the structure of the liquid crystal display device 100. FIG. 11 omits illustration of an FPC and a connector.

As shown in FIG. 11, in the conventional liquid crystal display device 100, in a side face 101a of the liquid crystal display device 100, engaging portions 104 for fixing the top and bottom covers 101 and 102 together are provided at three locations. Likewise, though not illustrated, also in the side face 101b opposite from the side face 101a, engaging portions 104 are provided at three locations symmetrically with those in the side face 101a. The engaging portions 104 are each composed of an engaging claw provided on the bottom cover 102 and an engaging hole provided in the top cover 101 so a to engage with the engaging claw.

In each of the side faces 101a and 101b, the positions at which the engaging portions 104 are formed are the following three locations: at both end parts, and at a middle part (cover middle part) of the top cover 101 (hence, of the bottom cover 102 as well) in the curve direction. That is, as shown in FIG. 11, the distance from the engaging portion 104 disposed at the cover middle part to that disposed at one end part and the distance from the engaging portion 104 disposed at the cover middle part to that disposed at the other end part are both L.

Here, as shown in FIG. 12, in the liquid crystal display device 100, the middle position C1 of the top cover 101 (hence, of the bottom cover 102 as well) in the curve direction is displaced from the middle position C2 of the display surface 103 in the curve direction. This results from the necessity of disposing the IC chip and LEDs for driving the display surface 103.

As described earlier, the conventional liquid crystal display device 100 having a curved display surface 103 suffers from uneven display. This uneven display is ascribable to the structure in which the display panel in a bent state is held between the top and bottom covers 101 and 102. Specifically, the bent display panel produces stress at the engaging portions 104 formed in the top and bottom covers 101 and 102.

To eliminate uneven display, accordingly, the stress that occurs at the engaging portions 104 has to be mitigated properly. In this respect, what is of particular note about the conventional structure is that it is not at a position corresponding to the middle position C2 of the display surface 103 in the curve direction, but at a position corresponding to the middle position C1 of the top cover 101 in the curve direction, that an engaging portion 104 is provided. That is, the conventional structure pays no attention to the display surface 103 in determining where to provide the engaging portions 104, with the result that the engaging portions 104 are not formed in a way that suits the purpose of eliminating uneven display. Moreover, while the conventional structure has the engaging portions 104 provided at no more than three locations, namely at the middle and at both ends, it has been found out that, for proper mitigation of the stress occurring at the engaging portions 104, it preferable to spread the stress as much as possible and to increase the number of engaging portions 104. Furthermore, also to reduce displacement of the display panel—a problem on its own apart from that of uneven display—, it has been found out that it is preferable to increase the number of engaging portions 104.

The liquid crystal display device 1 of the embodiment has been developed out of the above considerations. The description of the liquid crystal display device 1 of the embodiment will now be resumed with reference to FIGS. 4 to 7.

Figure 4:
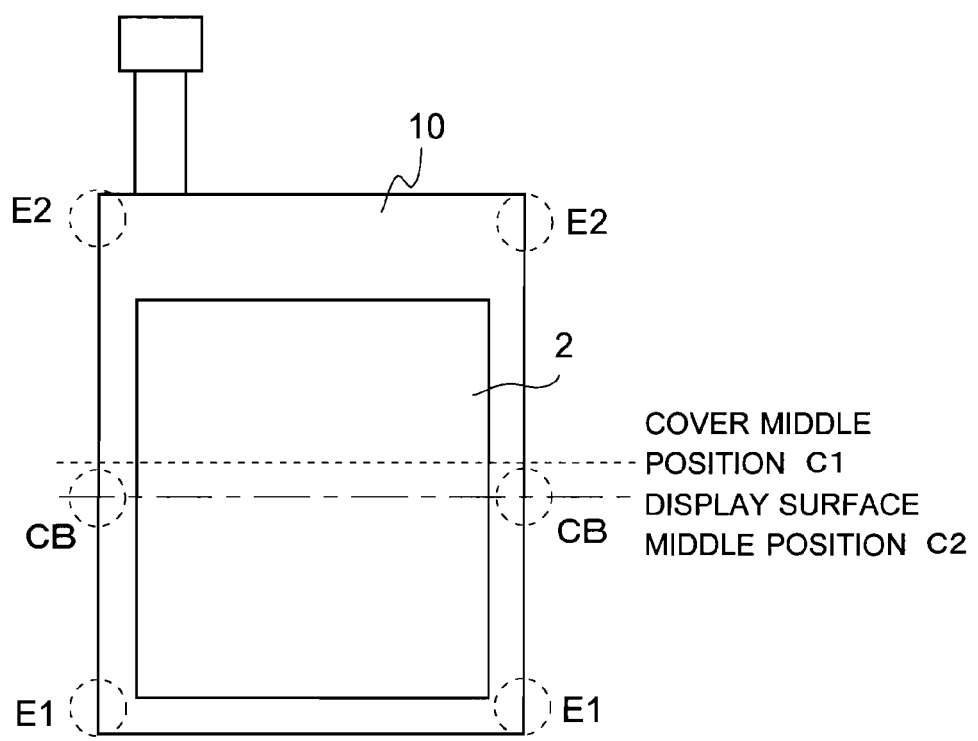
FIG. 4 is a schematic plan view illustrating the structure of the liquid crystal display device of the embodiment.
Figure 5A:
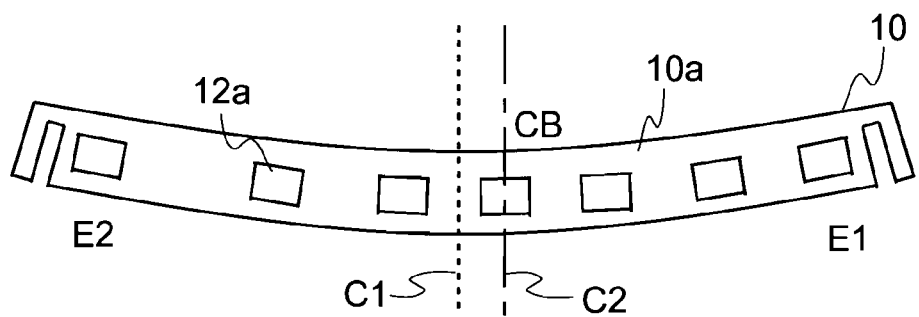
FIG. 5A is a diagram illustrating the structure of the top cover provided in the liquid crystal display device of the embodiment, the diagram being a schematic side view of the top cover.
Figure 5B:
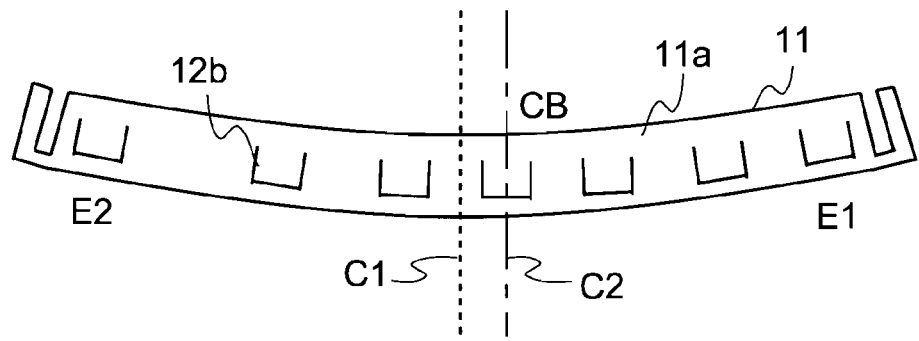
FIG. 5B is a diagram illustrating the structure of the bottom cover provided in the liquid crystal display device of the embodiment, the diagram being a schematic side view of the bottom cover.
Figure 6:
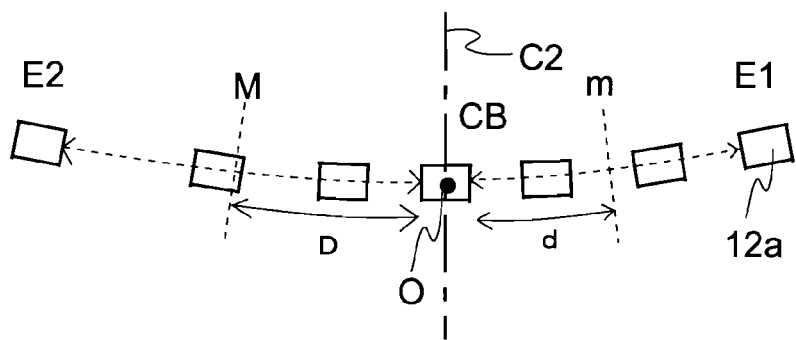
FIG. 6 is a diagram illustrating the structure of the engaging holes formed in the top cover provided in the liquid crystal display device of the embodiment.
Figure 7:
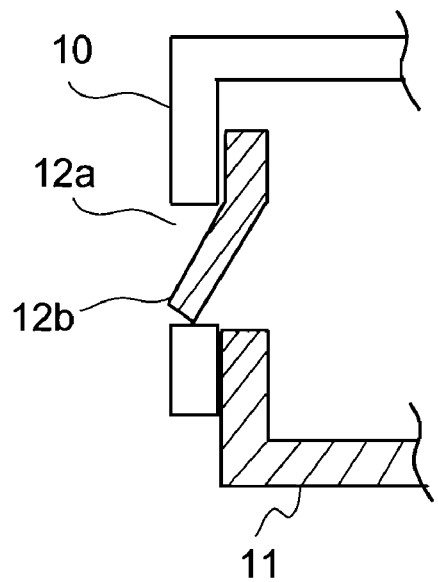
FIG. 7 is a schematic sectional view showing the relationship between an engaging hole formed in the top cover and an engaging claw formed on the bottom cover in the embodiment.

FIG. 4 is a schematic plan view illustrating the structure of the liquid crystal display device 1 of the embodiment. FIG. 5A is a diagram illustrating the structure of the top cover 10 provided in the liquid crystal display device 1 of the embodiment, the diagram being a schematic side view of the top cover 10. FIG. 5B is a diagram illustrating the structure of the bottom cover 11 provided in the liquid crystal display device 1 of the embodiment, the diagram being a schematic side view of the bottom cover 11. FIG. 6 is a diagram illustrating the structure of the engaging holes 12a formed in the top cover 10 provided in the liquid crystal display device of the embodiment. FIG. 7 is a schematic sectional view showing the relationship between an engaging hole 12a formed in the top cover 10 and an engaging claw 12b formed on the bottom cover 11 in the embodiment.

As shown in FIG. 4, also in the liquid crystal display device 1 of the embodiment, the middle position C1 of the top cover 10 (hence, of the bottom cover 11 as well) in the curve direction is displaced from the middle position C2 of the display surface 2 in the curve direction. Here, however, it is with respect to the middle position C2 of the display surface 2 that engaging portions 12 are formed.

The engaging portions 12 are each composed of an engaging hole 12a formed in the top cover 10 and an engaging claw 12b formed on the bottom cover 11 so as to engage with the engaging hole 12a. The engaging holes 12a are formed by making through holes in two side faces 10a and 10b of the top cover 10 (those two side faces are substantially parallel to the plane on which lie the curves extending in the curve direction). The engaging holes 12a formed in the two side faces 10a and 10b are provided at positions substantially symmetric across the display panel 5. The engaging claws 12b are formed by bending parts of two side faces 11a and 11b of the bottom cover 11 (those two side faces are substantially parallel to the plane on which lie the curves extending in the curve direction). The engaging claws 12b formed in the two side faces 11a and 11b are provided at positions substantially symmetric across the display panel 5.

The engaging claws 12b engage with the engaging holes 12a, and accordingly each engaging pair of them are provided at approximately the same position in the assembled liquid crystal display device 1 in its assembled state. As shown in FIG. 7, when the top cover 10 is placed on the bottom cover 11, the engaging claws 12b protruding from the side faces 11a and 11b of the bottom cover 11 engage with the engaging holes 12a in the top cover 10, and thereby prevents the top cover 10 from coming off the bottom cover 11.

Now, with reference mainly to FIGS. 4 to 6, the positions at which the engaging holes 12a and the engaging claws 12b are formed will be described in more detail. Since each engaging pair of the engaging holes 12a and the engaging claws 12b are formed at approximately the same position as mentioned above, the following description deals only with the engaging holes 12a. The positions at which the engaging holes 12a and the engaging claws 12b are provided are the positions of the engaging portions 12.

The engaging holes 12a are provided, in each of the two side faces 10a and 10b along the curves, as follows: one at each end part E1 and E2; one at a display surface middle part CB in which the middle position C2 of the display surface 2 in the curve direction falls; two between the display surface middle part CB and the end part E1; two between the display surface middle part CB and the end part E2.

As shown in FIG. 6, the engaging hole 12a provided at the display surface middle part CB has its center position O in the curve direction approximately coincident with the middle position C2 of the display surface 2 in the curve direction. It is preferable, though not essential, that the center position O and the middle position C2 be coincident as in this embodiment.

The two engaging holes 12a provided between the display surface middle part CB and the end part E1 and the two engaging hole 12a provided between the display surface middle part CB and the end part E2 are disposed substantially symmetrically about the engaging hole 12a provided at the display surface middle part CB. The reason is that such a structure is preferable for proper elimination of uneven display. This, however, is not meant to limit the scope of application of the present invention.

Moreover, the two engaging holes 12a adjacent to the engaging hole 12a disposed at the display surface middle part CB are disposed in the following manner: they are disposed between, at one end, the midpoint m in the curve direction between the engaging hole 12a disposed at the end part E1 and the engaging hole 12a disposed at the display surface middle part CB and, at the other end, the midpoint M in the curve direction between the engaging hole 12a disposed at the end part E2 and the engaging hole 12a disposed at the display surface middle part CB (see FIG. 6). While the distance (d) from the display surface middle part CB to the midpoint m differs from the distance (D) from the display surface middle part CB to the midpoint M, the two engaging holes 12a adjacent to the engaging hole 12a disposed at the display surface middle part CB are both disposed inward of (closer to the display surface middle part CB than are) the corresponding midpoints.

The reason for the above disposition is as follows. The stress occurring at the engaging portions 12 is larger the closer to the middle of the display panel 5. Thus, providing engaging holes 12a as close as possible to the display surface middle part CB makes it possible to spread the stress effectively. From this perspective, in the structure of the embodiment, it is also possible, for example, to dispose the two engaging holes 12a disposed between the end part E1 and the display surface middle part CB both inward of (closer to the display surface middle part CB than is) the midpoint m. In that case, the two engaging holes 12a disposed between the end part E2 and the display surface middle part CB are also disposed inward of (closer to the display surface middle part CB than is) the midpoint M.

As described above, in the liquid crystal display device 1 of the embodiment, an engaging portion 12 is formed at a location (the display surface middle part CB) corresponding to the middle position C2 of the display surface 2 in the curve direction. This makes it easy to reduce uneven display occurring on the display surface 2. Moreover, a plurality of engaging portions 12 are disposed between the end parts E1 and E2 and the display surface middle part CB. This makes it easy to spread stress, and helps reduce uneven display properly. Providing a number of engaging holes 12a also makes displacement of the display panel 5 less likely.

It should be understood that the embodiment presented above is in no way meant to limit how the present invention is implemented; many modifications and variations are possible without departing from the objects of the invention.

For example, although the embodiment deals with a structure in which seven engaging portions 12 are provided in each of the side faces 10a and 10b, this is not meant to be a limitation; only three of them may instead be provided at the end parts E1 and E2 and the display surface middle part CB. Even in that case, the engaging portions 12 are provided with respect to the middle position C2 of the display surface 2 in the curve direction. This makes it easy to reduce uneven display. To spread the stress occurring at the engaging portions 12, however, it is preferable, as in the embodiment, to provide further engaging portions 12 between the end parts E1 and E2 and the display surface middle part CB. For the purpose of spreading stress, more engaging portions 12 may be provided than there are in the embodiment.

Figure 8:
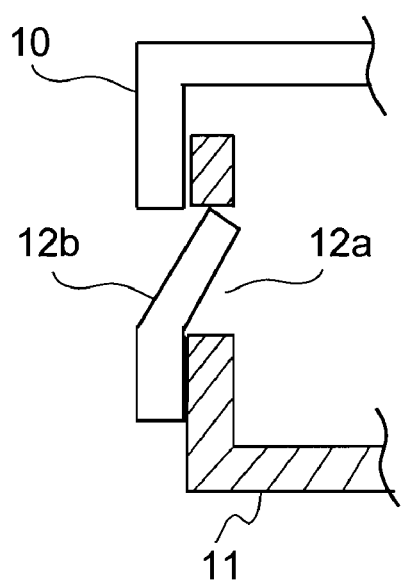
FIG. 8 is a diagrams showing a modified example of the liquid crystal display device of the embodiment.
Figure 9:
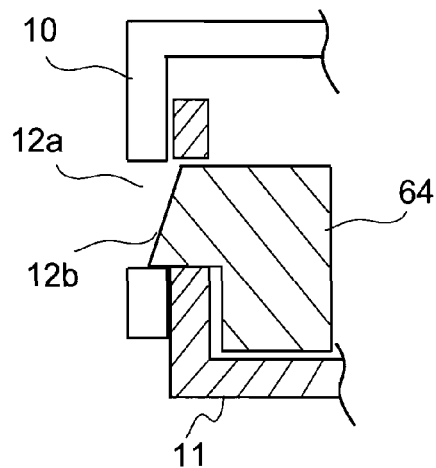
FIG. 9 is a diagrams showing a modified example of the liquid crystal display device of the embodiment.

Although the embodiment deals with a structure in which each engaging portion 12 is composed of an engaging hole 12a provided in the top cover 10 and an engaging claw 12b provided on the bottom cover 11, this is not meant to be a limitation. Instead, for example, as shown in FIG. 8, an engaging claw 12b may be provided on the top cover 10 and an engaging hole 12a may be provided in the bottom cover 11. For another example, as shown in FIG. 9, an engaging hole 12a may be provided in the top and bottom coves 10 and 11 and an engaging claw 12b may be provided on the holder 64 accommodated inside the top and bottom coves 10 and 11. For yet another example, in a structure where the holder extends out of the bottom cover, an engaging hole may be formed in the top cover and an engaging claw may be provided on the holder. FIGS. 8 and 9 are diagrams each showing a modified example of the liquid crystal display device 1 of the embodiment.

Although the foregoing discusses a liquid crystal display device having a liquid crystal display panel as a display panel, the application of the present invention is not limited to liquid crystal display devices. Specifically, the invention is naturally applicable to, for example, display devices having a display panel using an electrooptic material other than liquid crystal as an optical switching material. Although the foregoing discusses a case where the display surface is concave, the present invention is applicable also in cases where the display surface is convex.

INDUSTRIAL APPLICABILITY

The present invention is applicable to display devices having a curved display surface, and is suitably applicable particularly to liquid crystal display devices.

LIST OF REFERENCE SIGNS

1 Liquid crystal display device
2 Display surface
5 Display panel
6 Backlight
10 Top cover
10a, 10b Side face of top cover
11 Bottom cover
11a, 11b Side face of bottom cover
12 Engaging portion
12a Engaging hole
12b Engaging claw
51 First panel substrate
52 Second panel substrate
53 Liquid crystal
64 Holder (frame member)
C1 Middle of cover in curve direction
C2 Middle of display surface in curve direction
CB Display surface middle part
E1, E2 End part
m, M Midpoint
O Center

The invention claimed is:

1. A display device comprising:
a display panel kept in a bent state so as to have a curved display surface;
a pair of curved covers holding the display panel therebetween; and
a plurality of engagement portions formed in each of two side faces disposed opposite each other across the display panel, the engagement portions fixing the covers together so as not to come off,
wherein
a middle position of the covers in a curve direction is displaced from a middle position of the display surface in the curve direction,
the engagement portions provided in one of the two side faces and the engagement portions provided in the other of the two side faces are disposed substantially symmetrically across the display panel, and
positions at which the engagement portions are provided at least include both end parts in the curve direction and a display surface middle part including the middle position of the display surface in the curve direction.

2. The display device according to claim 1, wherein
a center position, in the curve direction, of the engagement portion disposed at the display surface middle part approximately coincides with the middle position of the display surface in the curve direction.

3. The display device according to claim 1, wherein
the positions at which the engagement portions are provided further include at least one location between one of the end parts and the display surface middle part and at least one location between the other of the end parts and the display surface middle part, and
an engagement portion disposed between the one of the end parts and the display surface middle part and an engagement portion disposed between the other of the end parts and the display surface middle part are disposed substantially symmetrically about the display surface middle part.

4. The display device according to claim 3, wherein
of the engagement portion disposed between the one of the end parts and the display surface middle part and the engagement portion disposed between the other of the end parts and the display surface middle part, at least an engagement portion adjacent to the engagement portion disposed at the display surface middle part is disposed between, at one end, a midpoint, in the curve direction, between the engagement portion disposed at the one of the end parts and the engagement portion disposed at the display surface middle part and, at the other end, a midpoint, in the curve direction, between the engagement portion disposed at the other of the end parts and the engagement portion disposed at the display surface middle part.

5. The display device according to claim 1, wherein
the engagement portions each comprise an engaging claw provided on one of the covers and an engaging hole provided in the other of the covers to engage with the engaging claw.

6. The display device according to claim 1, wherein
the engagement portions each comprise an engaging claw provided on a curved frame member accommodated inside the covers and an engaging hole provided in both of the covers to engage with the engaging claw.

7. The display device according to claim 1, wherein
the display panel is a liquid crystal display panel,
a backlight is disposed behind the display panel in the bent state, and
the display panel and the backlight are held between the covers.

8. The display device according to claim 2, wherein
the display panel is a liquid crystal display panel,
a backlight is disposed behind the display panel in the bent state, and the display panel and the backlight are held between the covers.

9. The display device according to claim 3, wherein
the display panel is a liquid crystal display panel,
a backlight is disposed behind the display panel in the bent state, and the display panel and the backlight are held between the covers.

10. The display device according to claim 4, wherein the display panel is a liquid crystal display panel, a backlight is disposed behind the display panel in the bent state, and the display panel and the backlight are held between the covers.

11. The display device according to claim 5, wherein the display panel is a liquid crystal display panel, a backlight is disposed behind the display panel in the bent state, and the display panel and the backlight are held between the covers.

12. The display device according to claim 6, wherein the display panel is a liquid crystal display panel, a backlight is disposed behind the display panel in the bent state, and the display panel and the backlight are held between the covers.

* * * * *